US006189076B1

United States Patent
Fadavi-Ardekani et al.

(10) Patent No.: US 6,189,076 B1
(45) Date of Patent: Feb. 13, 2001

(54) SHARED SYNCHRONOUS MEMORY WITH A SWITCHING CIRCUIT CONTROLLED BY AN ARBITER AND METHOD FOR GLITCH FREE SWITCHING OF A CLOCK SIGNAL

(75) Inventors: Jalil Fadavi-Ardekani, Orefield; Bahram Ghaffarzadeh Kermani, Whitehall, both of PA (US)

(73) Assignee: Lucent Technologies, Inc., Murray Hill, NJ (US)

(*) Notice: Under 35 U.S.C. 154(b), the term of this patent shall be extended for 0 days.

(21) Appl. No.: 09/102,777

(22) Filed: Jun. 23, 1998

Related U.S. Application Data

(60) Provisional application No. 60/065,855, filed on Nov. 14, 1997.

(51) Int. Cl.[7] ............................. G06F 13/00; G06F 1/06
(52) U.S. Cl. ........................ 711/147; 711/151; 711/167; 713/501; 713/600
(58) Field of Search ................................. 711/167, 131, 711/147, 149, 151, 157, 168, 211; 365/230.02, 189.02, 233; 713/501, 503, 500, 600, 400

(56) References Cited

U.S. PATENT DOCUMENTS

| | | | |
|---|---|---|---|
| 3,715,729 | * | 2/1973 | Mercy ................................. 709/400 |
| 4,164,787 | * | 8/1979 | Aranguren ......................... 713/600 |
| 4,400,771 | * | 8/1983 | Suzuki et al. ....................... 711/151 |
| 5,179,667 | * | 1/1993 | Iyer .................................... 711/167 |
| 5,274,678 | * | 12/1993 | Ferolito et al. .................... 327/141 |
| 5,754,838 | * | 5/1998 | Shibata et al. ..................... 711/151 |
| 5,758,136 | * | 5/1998 | Carlson .............................. 713/501 |
| 5,784,582 | * | 7/1998 | Hughes .............................. 710/117 |
| 5,790,609 | * | 8/1998 | Swoboda ........................... 713/501 |
| 5,822,776 | * | 10/1998 | De Korte et al. ................. 711/167 |
| 5,907,862 | * | 5/1999 | Smalley ............................. 711/163 |

* cited by examiner

Primary Examiner—Glenn Gossage
(74) Attorney, Agent, or Firm—William H. Bollman

(57) ABSTRACT

A multiple agent system allowing each of a plurality of agents, i.e., processors, to present a different address, data, control and/or clock signals to a common shared synchronous memory. The signals from each of the agents is arbitrated in response to a memory access request to determine a winning agent. The address, data, control and clock signals to the shared synchronous memory are controlled so as to prevent undesirable high frequency waveforms and/or glitches from being presented to the shared synchronous memory during an arbitration period including a transition period between the previous owner's clock signal and the winning agent's clock signal. For instance, in the case of the clock signal, a clock switching control circuit disables the clock signal to the shared synchronous memory during the arbitration period for a period of time of at least about one phase of an arbiter clock signal before the transition period and one phase of the arbiter clock signal after the transition period. In the case of the address, data and control signals, an enable disactivation signal disables the output of the address, data and control signals to the shared synchronous memory during a transition period including the arbitration period.

20 Claims, 3 Drawing Sheets

SHARED SYNCHRONOUS MEMORY WITH A SWITCHING CIRCUIT CONTROLLED BY AN ARBITER AND METHOD FOR GLITCH FREE SWITCHING OF A CLOCK SIGNAL

This application claims priority from U.S. Provisional Application Ser. No. 60/065,855 entitled "Multipurpose Digital Signal Processing System" filed on Nov. 14, 1997, the specification of which is hereby expressly incorporated herein by reference.

BACKGROUND OF THE INVENTION

1. Field of the Invention

This invention relates generally to the shared usage of memory by a plurality of agents, i.e., processors. In particular, it relates to the synchronization of a clock signal to shared synchronous memory using an arbiter-controlled switched clock.

2. Background of Related Art

With the ever-increasing speeds of today's processors, memory designs have attempted to meet the required speed requirements. For instance, synchronous memory such as synchronous static random access memory (SSRAM) and synchronous dynamic random access memory (SDRAM) are commonly available synchronous types of memory.

Synchronous memory technology is currently used in a wide variety of applications to close the gap between the needs of high-speed processors and the access time of asynchronous memory such as dynamic random access memory (DRAM). Synchronous memory, e.g., SDRAM technology, combines industry advances in fast dynamic random access memory (DRAM) with a high-speed interface.

Functionally, an SDRAM resembles a conventional DRAM, i.e., it is dynamic and must be refreshed. However, the DRAM architecture has improvements over standard DRAMs. For instance, an SDRAM uses internal pipelining to improve throughput and on-chip interleaving between separate memory banks to eliminate gaps in output data.

The idea of using an SDRAM synchronously (as opposed to using a DRAM asynchronously) emerged in light of increasing data transfer demands of high-end processors. SDRAM circuit designs are based on state machine operation instead of being level/pulse width driven as in conventional asynchronous memory devices. Instead, the inputs are latched by the system clock. Since all timing is based on the same synchronous clock, designers can achieve better specification margins. Moreover, since the SDRAM access is programmable, designers can improve bus utilization because the processor can be synchronized to the SDRAM output.

The core of an SDRAM device is a standard DRAM with the important addition of synchronous control logic. By synchronizing all address, data and control signals with a single clock signal, SDRAM technology enhances performance, simplifies design and provides faster data transfer.

Similar advantages hold for other types of synchronous memory, e.g., SSRAM or even synchronous read only memory.

Synchronous memory requires a clock signal from the accessing agent to allow fully synchronous operation with respect to the accessing agent.

For example, FIG. 3 shows a prior art system including one agent 300 and a synchronous memory 302, e.g., SRAM. The agent 300 communicates with the synchronous memory 312 using appropriate address, data and control buses (ADC) 306, and a clock signal 304. Because the synchronous memory 302 has only one accessing agent 300, the synchronous memory 302 need only contend with one clock signal 304.

Conventional synchronous memory systems utilize only a single agent. If more than one agent were to be given access to a shared synchronous memory, each agent must supply its own clock signal to the synchronous memory. Unfortunately, the clock signals from separate agents are typically not synchronous or in phase with one another, and thus conventional synchronous memory systems are not shared among a plurality of agents, without using an asynchronous interface, which may be prone to glitches and/or race conditions. This is potentially wasteful of memory in systems having a plurality of agents because the memory must be sized for a maximum potential application for each agent.

Moreover, undesirable conditions would result from the potential for interruption and/or incomplete address, data and/or control access to the shared synchronous memory. For instance, transitional changes of address, data and/or control signals could cause damage to memory cells, unwanted write operations to certain memory cells, and/or unwanted read operations causing the appearance of data on an output data bus of the shared synchronous memory shared with the output data bus of other shared synchronous memory resulting in short circuits on the output data bus.

There is thus a need for a system which is capable of sharing synchronous memory among a plurality of agents.

SUMMARY OF THE INVENTION

In accordance with the principles of the present invention, a synchronous memory system comprises a shared synchronous memory. A plurality of agents have access to the synchronous memory. A switch allows a clock signal from a selected one of the plurality of agents to be provided to the synchronous memory, wherein any of the plurality of agents may have access to the shared synchronous memory.

In accordance with another aspect of the present invention, a shared memory system comprises a shared memory. A first agent has access to the shared memory, and a second agent has access to the shared memory. A switch is provided between a first clock signal from the first agent and the shared memory, and between a second clock signal from the second agent and the shared memory.

A method of transitioning a clock signal from a first agent to a shared synchronous memory to a clock signal from a second agent to the shared synchronous memory in accordance with the principles of the present invention comprises providing the first agent access to the shared synchronous memory. A memory request signal from the second agent is arbitrated, and a clock signal from the first agent with respect to the shared synchronous memory is deactivated during an arbitration period. The second agent is provided access to the shared synchronous memory.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a memory arbitration system which allows efficient and reliable sharing of common synchronous memory among a plurality of agents, e.g., having different memory access clock signals. The present invention transitions the clock signals to the shared synchronous memory from a previous to a winning agent's clock, and prevents erroneous address, data and/or control access to the shared synchronous memory during the transition period from the previous to the winning agent.

Figure 1:
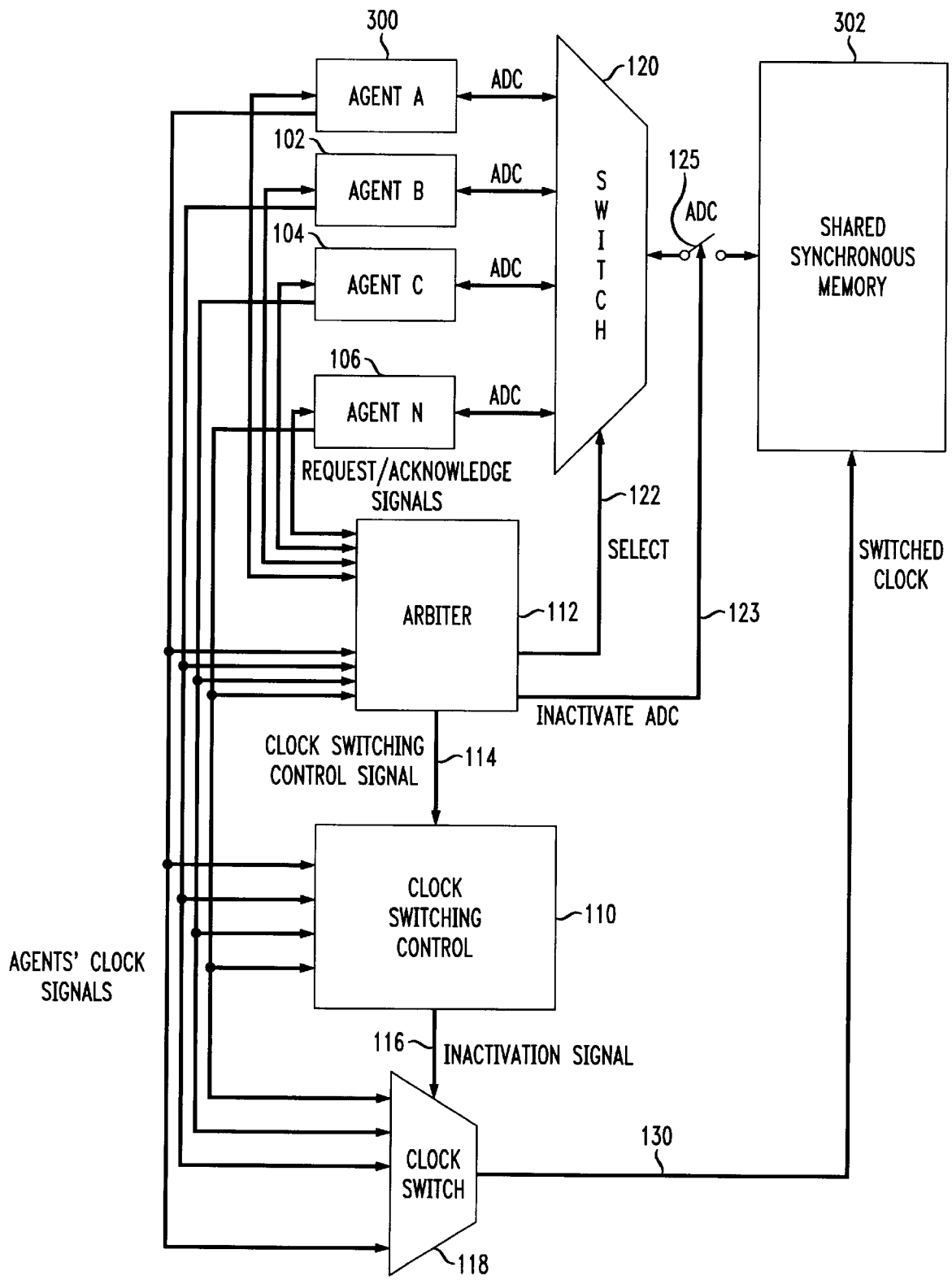
FIG. 1 shows a first embodiment of the present invention wherein a synchronous memory is allowed to be shared by a plurality of agents each being allowed to have a different clock signal.

FIG. 1 shows a first embodiment of the present invention wherein a multiple agent system has one or more agents which are allowed to present different synchronizing clock signals to shared synchronous memory. The specific embodiments disclosed relate to SSRAM, but the principles of the present invention relate equally to all types of synchronous memory.

In particular, FIG. 1 shows a synchronous memory system accessible by a plurality of agents 300, 102, 104, 106. Each of the agents 300, 102, 104, 106 provides respective address, data and control signals to a common shared synchronous memory 302 through a multiplexing switch 120. An arbiter 112 arbitrates memory access request signals from each of the agents 300, 102, 104, 106 and controls the multiplexing switch 120 to allow one agent at a time to provide address, data and control signals to the shared synchronous memory 302. A clock switching control 110 and a clock switch 118 operate in coordination with the arbiter 112 to provide an appropriate clock signal to the shared synchronous memory 302.

The shared synchronous memory 302 may be any suitable synchronous memory, dynamic or static. Moreover, the agents 300, 102, 104, 106 may be any suitable processing elements, e.g., a microcontroller, a microprocessor, or a digital signal processor (DSP).

The multiplexing switch 120 provides both a multiplexing function and an on/off switching function. In its multiplexing function, the multiplexing switch 120 presents the address, data and control bus from any one of the plurality of agents 300, 102, 104, 106 to the address, data and control bus of the shared synchronous memory 302. In its switching function designated by switch 125, the multiplexing switch 120 can disable its output, i.e., the multiplexing switch either presents the selected address, data and control bus to the shared synchronous memory 302 or disables the output of the multiplexing switch 120 to prevent erroneous signaling to the shared synchronous memory 302.

The multiplexing switch 120 is controlled by a select signal 122 and an enable inactivation signal 123 determined by an arbiter 112. The select signal 122 indicates which agent's address, data and control bus will be allowed to access the shared synchronous memory 302 through the multiplexing switch 120, and the enable inactivation signal 123 causes the output of the multiplexing switch 120 to be disabled, e.g., tri-stated, during periods of arbitration.

The arbiter 112 receives a memory request signal as appropriate from each of the plurality of agents 300, 102, 104, 106, and selects a winning agent's clock signal for access to the shared synchronous memory 302. A winning agent is an agent which has requested access to the shared synchronous memory 302 and which is granted that request. In the event that more than one agent 300, 102, 104, 106 requests access to the shared synchronous memory 302 at the same time, the arbiter 112 determines the winning agent based on appropriately predetermined rules. Upon completion of arbitration by the arbiter 112, the winning agent is informed of its memory ownership via an acknowledge signal. The acknowledge signal issued by the arbiter 112 is preferably synchronized with the winning agent's clock signal.

The present invention allows the next, winning agent, i.e., the winner in an arbitration for the shared synchronous memory 302, to present its respective clock signal and its address, data and control bus to the shared synchronous memory 302 efficiently, reliably, and without causing erroneous operation of the shared synchronous memory 302 due to the change of the synchronous clock signal or due to an interrupted or otherwise erroneous communication over the respective address, data and control bus. For instance, when terminating ownership of the shared synchronous memory 302 by any of the previous agents 300, 102, 104 or 106, control of the clock switching circuit 110 remains based on the terminating agent's clock for a period of time. Moreover, the address, data and control bus is removed from presentation to the shared synchronous memory 302 during the arbitration period.

In particular, a synchronous memory 302 such as SDRAM requires one or more clock signals for its operation. If the synchronous memory 302 is shared between a plurality of agents, e.g., between agents 300, 102, 104 and 106, there is a possibility that the sharing agents 300, 102, 104 and 106 would not provide clock signals having the same frequency and phase, i.e., would not provide synchronized clock signals. In accordance with the principles of the present invention, the respective clock signals and the address, data and control signals from the plurality of agents 300, 102, 104 and 106 are all essentially removed from the shared synchronous memory 302 during a transitional arbitration period. During this arbitration period, the clock signal to the shared synchronous memory 302 is parked to a neutral clock signal, and the output of the multiplexing switch 120 is tri-stated or zeroed. At the end of the arbitration period, the shared synchronous memory 302 is provided with the next or winning agent's clock signal and the winning agent's address, data and control signal.

A glitchless clock signal from the winning agent is provided to the shared synchronous memory 302 using the arbiter 112, the clock switching control circuit 110, and the clock multiplexing switch 118, as shown in FIG. 1.

In particular, the clock signals from each of the agents 300, 102, 104, 106 are provided to the arbiter 112, to the clock switching control circuit 110, and to the clock multiplexing switch 118.

The clock multiplexing switch 118 outputs the selected clock signal of the winning agent to the shared synchronous memory 302 based on the agent selected by the arbiter 112 and on the state of the inactivation signal 116 from the clock switching control circuit 110.

The clock switching control circuit 110 determines an inactivation signal 116 for controlling the clock multiplexing switch 118. The inactivation signal 116, when inactive, allows the clock signal of a selected one of the plurality of agents 300, 102, 104 and 106 to operate the shared synchronous memory 302. The arbiter 112 provides clock switching control signals 114 to the clock switching control circuit 110 to ensure that a glitch-free clock signal is presented to the shared synchronous memory 302.

Figure 2:
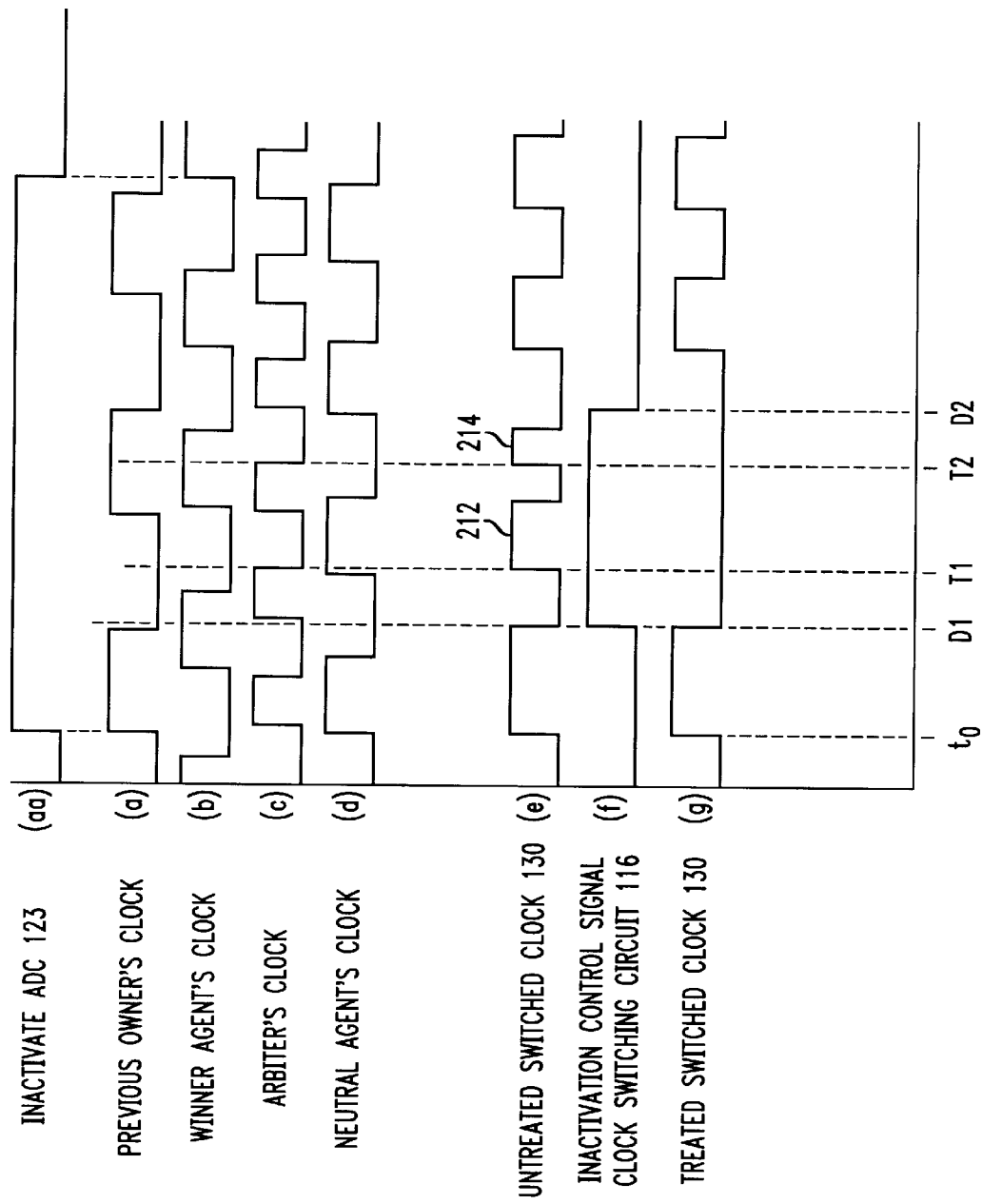
FIG. 2 shows clock signals useful for explaining the operation of the principles of the present invention.
Figure 3:
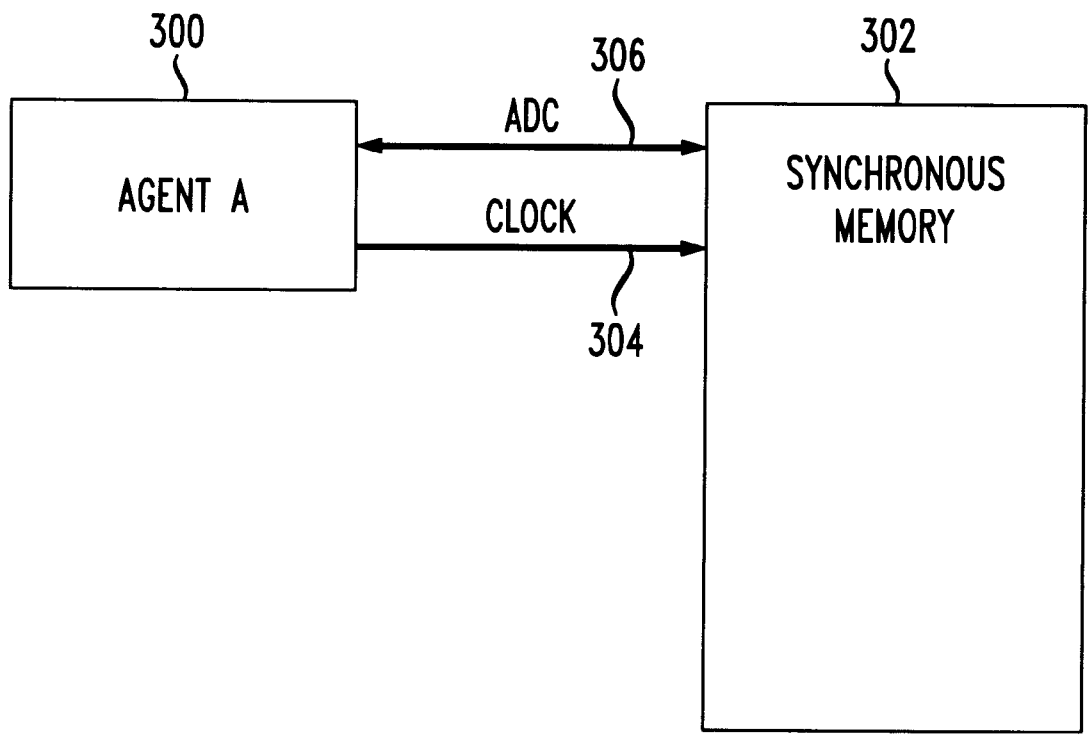
FIG. 3 shows a conventional system having only one agent access a synchronous memory block.

FIG. 2 shows in more detail the functions of the arbiter 112 and the clock switching control circuit 110, in combination with the clock multiplexing switch 118 and multiplexing switch 120, to provide a glitch-free clock signal and a safe address, data and control bus to the shared synchronous memory 302. The disclosed arbiter 112 is a synchronous circuit, and therefore can determine the position of transition points with respect to the edges of the arbiter's clock signal. The present invention takes advantage of the above fact, and provides a pulse beginning a phase earlier than a first transition point T1, and ending one phase after a last or second transition point T2, to provide a one phase margin on each side of the first and second transition points T1, T2, guaranteeing a glitch-free switching of clock signals from any of the plurality of agents 300, 102, 104, 106 to the shared synchronous memory 302. Moreover, the address, data and control bus is removed from the shared synchronous memory 302 during the arbitration period corresponding to the activation of the enable inactivation signal 123 between points D1 to D2 to prevent erroneous operation of the shared synchronous memory 302.

In particular, waveform (a) of FIG. 2 shows an example of a clock signal of the previous owning agent as presented to the shared synchronous memory 302. An owning agent is an agent which is currently operating the shared synchronous memory 302 at a particular point in time. The owning agent owns the shared synchronous memory 302 up until point D1 at which time the arbiter 112 begins an arbitration process to determine the next owner of the shared synchronous memory 302. The arbitration may be by any conventional means, e.g., first come first served, or on a priority basis. From time 0 through time D1, the clock signal of the previous owning agent shown in waveform (a) is presented to the shared synchronous memory 302.

Waveform (b) shows the clock signal of the next or winning agent. After point D2, the clock signal of the winning agent shown in waveform (b) is presented to the shared synchronous memory 302. The present invention provides a smooth transition switchover between the previous owning agent's clock signal and the next agent's clock signal, using the arbitration period between points D1 and D2.

Note that in the example of FIG. 2, the clock signal from the previous owning agent's clock signal, e.g., as shown in waveform (a) has a different frequency and phase from that of the next agent's, e.g., as shown in waveform (b). Although the clock signals from the plurality of agents may be the same or different in frequency in accordance with the principles of the present invention, a description of the present invention with respect to clock signals having different frequency and phase will help in the description of the advantages of certain aspects of the present invention.

Waveform (c) shows a clock signal representing the operation clock signal of the arbiter 112. The arbiter 112 in the example shown in FIGS. 1 and 2 functions on the falling edge of this arbiter clock signal.

Waveform (d) of FIG. 2 shows a neutral clock signal. The arbiter 112 is synchronized with the neutral clock signal, e.g., as shown in FIG. (2). The neutral clock signal does not have to be sourced by any of the plurality of agents 300, 102, 104, 106, and does not have to have a certain frequency, but preferably is an independent clock signal having a frequency at least as fast as the fastest clock signal from among all of the plurality of agents 300, 102, 104, 106. Thus, waveform (d) shows a clock signal having a frequency which is at least as high as the frequency of waveforms (a) and (b). Of course, the neutral clock signal may have a frequency which is greater or less than the clock signals of all of the plurality of agents 300, 102, 104 and 106. The neutral clock signal need not be synchronized with any of the clock signals from the plurality of agents 300, 102, 104 or 106. The neutral clock signal can be different from one or all of the agents' respective clock signals.

The arbiter 112 determines the first and second transition points T1 and T2 after which the agent which previously owned the shared synchronous memory 302, e.g., having the clock signal shown in waveform (a), will relinquish its clock signal to the shared synchronous memory 302, and the winning agent, e.g., having the clock signal shown in waveform (b), will be given access to the shared synchronous memory 302.

A simple switchover from the clock signal from the previous agent shown in waveform (a) to the clock signal from the winning agent shown in waveform (b) has the possibility of glitching the shared synchronous memory 302, e.g., as shown by the theoretical untreated switched clock signal shown in waveform (e). However, the untreated switched clock signal shown in waveform (e) may contain frequencies and/or glitches such as those shown at 212 and 214 which might exceed the capability of the shared synchronous memory 302, causing the potential for erroneous operation of the shared synchronous memory 302.

The present invention provides for deactivation of the switched clock signal 130 to the shared synchronous memory 302 during the arbitration period between the points D1 and D2 sufficient to avoid the presentation of high frequency waveforms and/or glitches to the shared synchronous memory 302. In the disclosed example, the switched clock signal 130 to the shared synchronous memory 302 is deactivated based on activation of the inactivation signal 116 from the arbiter 112 through the clock switching control circuit 110 as shown in FIG. 1 and waveform (f) of FIG. 2. The inactivation signal 116 controls the clock switch 118 into an inactive state to prevent the presentation of any clocking signal to the shared synchronous memory 302, particularly a clock signal which might contain glitches and/or high frequency waveforms. Moreover, the inactivation signal 116 is based upon the enable inactivation signal 123 to the multiplexing switch 120 to control presentation of the address, data and control bus signals to the shared synchronous memory 302.

The arbiter 112 in the disclosed embodiment is a synchronous circuit. Therefore, it is possible to determine the position of the first transition point T1 with respect to the edges of the arbiter clock signal shown in waveform (c). Accordingly, it is also possible to create the inactivation control signals 116, 123, e.g., as shown in waveform (f). When the inactivation signals 116, 123 are active, e.g., in a high logic state, the switched clock signal 130 output from the clock switch 118 and the switched address, data and control signals output from the multiplexing switch 120 to the shared synchronous memory 302 may be held stable, e.g., in a low logic state. However, when the inactivation signals 116, 123 are inactive, i.e., in a low logic state, the switched clock signal 130 output from the clock switch 118 and the switched address, data and clock signals output from the multiplexing switch 120 are allowed to be presented to the shared synchronous memory 302.

The arbitration period begins at point D1 (i.e., approximately one phase earlier than the first transition point T1), and ends approximately one phase after the second transition point T2 at point D2. The one phase margin in the arbitration period at each side of the transition points T1 and T2 guarantees that a non-glitching clock signal and address, data and control signals are presented to the shared synchronous memory 302.

Waveform (g) shown in FIG. 2 represents the treated switched clock signal 130 output by the clock multiplexing switch 118 based on clock switching control signals 114 indicating both the identity of the winning agent (from the arbiter 112) and based on the inactivation signal 116 (from the clock switching control circuit 110). Thus, the switched clock signal 130 as shown in waveform (g) is presented to the shared synchronous memory 302 without glitches or excessively fast pulses. Note in particular that the high frequency or glitch portions 212, 214 of the untreated switched clock signal shown in waveform (e) are removed from the clock signal 130 presented to the shared synchronous memory 302 as shown in waveform (g).

Waveform (aa) in FIG. 2 depicts the enable inactivation signal 123 corresponding to a removal of the address, data and control signals using switch 125 as shown in FIG. 1.

Accordingly, the present invention provides a switching mechanism which re-synchronizes a synchronously arbitrated clock signal using an arbitrated switched clock signal.

Although shown with respect to shared SRAM, the present invention is equally applicable to the sharing of other types of synchronous memory, e.g., synchronous read only memory.

While the invention has been described with reference to the exemplary embodiments thereof, those skilled in the art will be able to make various modifications to the described embodiments of the invention without departing from the true spirit and scope of the invention.

What is claimed is:

1. A system comprising:
   a shared synchronous memory;
   a plurality of agents having access to said synchronous memory;
   a switch to selectively present a signal which includes a clock signal from a selected one of said plurality of agents to be provided to said shared synchronous memory;
   an arbiter to arbitrate between said plurality of agents to determine a next user of said shared synchronous memory;
   wherein each of said plurality of agents may have access to said shared synchronous memory; and
   wherein said switch is adapted to deactivate said signal during an arbitration period.

2. The system according to claim 1, wherein:
   said signal includes address, data and control signals.

3. The system according to claim 1, wherein:
   each of said plurality of agents is adapted to transmit a memory request signal to said arbiter; and
   said arbiter is adapted to return an acknowledge signal to a next user of said shared synchronous memory.

4. The system according to claim 1, wherein:
   said synchronous memory system further comprising:
   a second switch to allow address, data and control signals from the selected one of said plurality of agents to be provided to said shared synchronous memory.

5. The synchronous memory system according to claim 1, wherein:
   said shared synchronous memory is static memory.

6. The synchronous memory system according to claim 1, wherein:
   said shared synchronous memory is dynamic memory.

7. The synchronous memory system according to claim 1, wherein:
   said shared synchronous memory is synchronous read only memory.

8. A method of transitioning a clock signal from a first agent to a shared synchronous memory to a clock signal from a second agent to said shared synchronous memory, said method comprising:
   providing said first agent access to said shared synchronous memory;
   arbitrating a memory request signal from said second agent;
   deactivating a clock signal from said first agent to said shared synchronous memory during an arbitration period; and
   providing said second agent access to said shared synchronous memory.

9. The method according to claim 8, said method further comprising:
   synchronizing a neutral clock signal to a clock signal from at least one of said first agent and said second agent.

10. The method according to claim 8, said method further comprising:
    providing a neutral clock signal to said shared synchronous memory during said arbitration period.

11. The method according to claim 8, said method further comprising:
    removing control signals from said shared synchronous memory during said arbitration period.

12. The method according to claim 11 said method further comprising:
    removing at least one of address and data signals from said shared synchronous memory during said arbitration period.

13. Apparatus for transitioning a clock signal from a first agent to a shared synchronous memory to a clock signal from a second agent to said shared synchronous memory, comprising:
    means for providing said first agent access to said shared synchronous memory;
    means for arbitrating a memory request signal from said second agent;
    means for deactivating a clock signal from said first agent to said shared synchronous memory during an arbitration period; and
    means for providing said second agent access to said shared synchronous memory.

14. The apparatus according to claim 13, further comprising:
    means for providing a neutral clock signal to said shared synchronous memory during said arbitration period.

15. The apparatus according to claim 13, further comprising:
    means for synchronizing a neutral clock signal to a clock signal from at least one of said first agent and said second agent.

16. The apparatus according to claim 13, further comprising:
    means for removing control signals from said shared synchronous memory during said arbitration period.

17. The apparatus according to claim 16, further comprising:
    means for removing at least one of address and data signals from said shared synchronous memory during said arbitration period.

18. A system, comprising:

a shared synchronous memory;

a first agent having access to said shared synchronous memory;

a second agent having access to said shared synchronous memory; and a switch to selectively present a first signal which includes a first clock signal from said first agent to said shared synchronous memory, and a second signal which includes a second clock signal from said second agent to said shared synchronous memory; and a switching control circuit adapted to deactivate an output of said switch during an arbitration period between switching of said switch from a first position allowing said first signal from said first agent to be presented to said shared memory and a second position allowing said second signal from said second agent to be presented to said shared memory.

19. The system according to claim 18, wherein:

said switching control circuit is synchronized to a neutral clock signal.

20. The system according to claim 19, wherein:

said neutral clock signal is synchronized to at least one of said first signal and said second signal.

* * * * *